July 16, 1957    M. HUNTLEY ET AL    2,799,129
BALE DROPPER ATTACHMENT FOR HAY BALERS
Filed April 16, 1956    3 Sheets-Sheet 1

Martin Huntley
Richard C. Huntley
INVENTORS

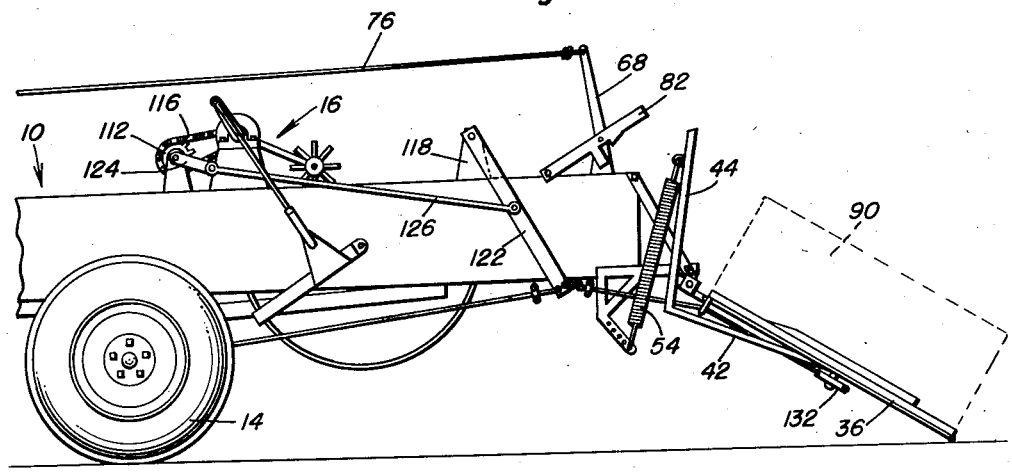
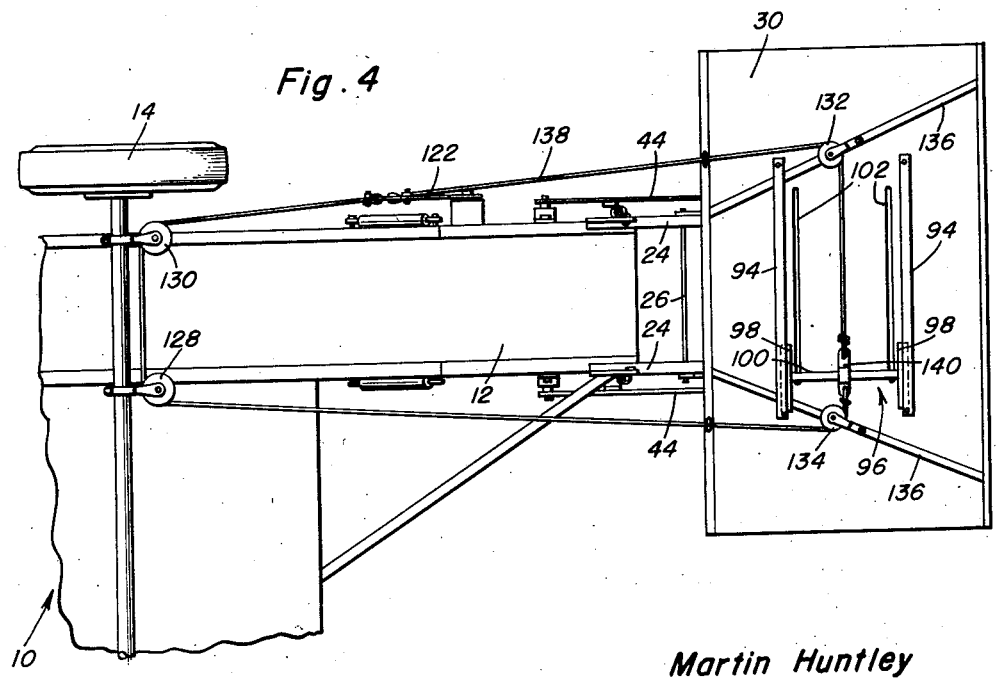

July 16, 1957     M. HUNTLEY ET AL     2,799,129
BALE DROPPER ATTACHMENT FOR HAY BALERS
Filed April 16, 1956     3 Sheets-Sheet 3
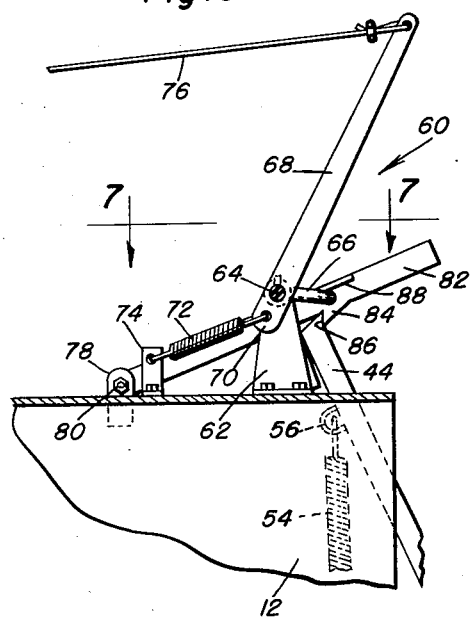
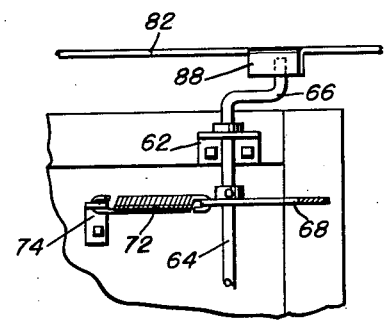
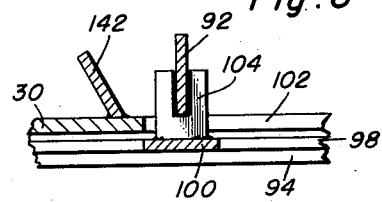
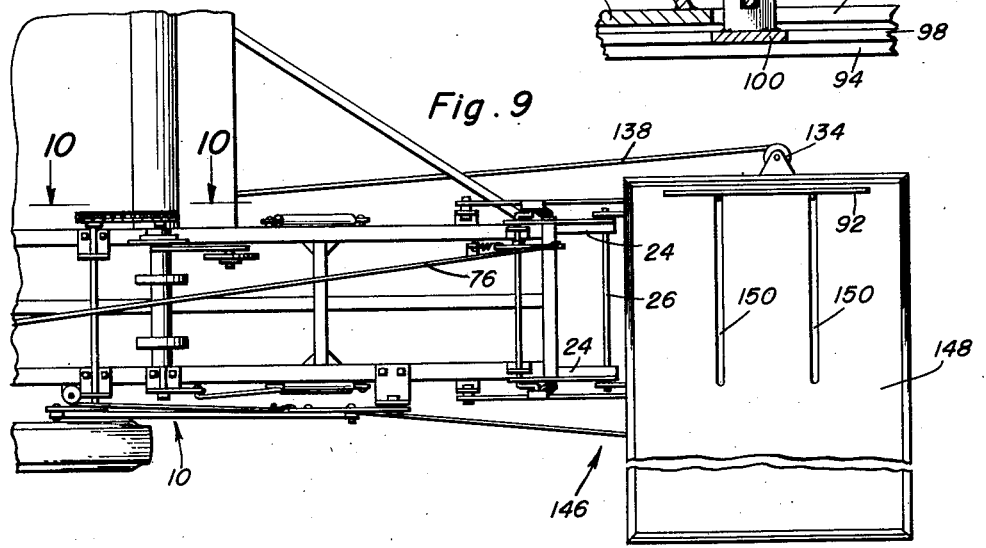
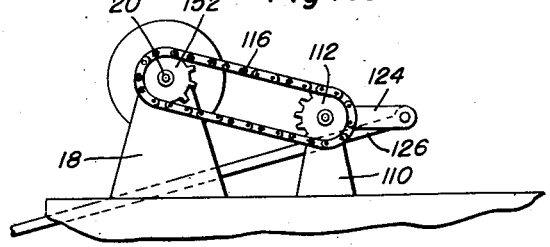
Martin Huntley
Richard C. Huntley
INVENTORS

United States Patent Office 2,799,129
Patented July 16, 1957

2,799,129

BALE DROPPER ATTACHMENT FOR HAY BALERS

Martin Huntley and Richard C. Huntley, Craigmont, Idaho

Application April 16, 1956, Serial No. 578,415

6 Claims. (Cl. 56—473.5)

This invention relates in general to new and useful improvements in farm equipment, and more specifically to a bail dropper attachment for hay balers.

During the normal operation of a hay baler, as each bale is formed, it is tied and then dropped out of the rear end of the hay baler. As a result, the bales of hay are scattered unevenly over the field and it is necessary for the farmer to stop and pick up each and every bale. It is therefore the primary object of this invention to provide an attachment for a hay baler which will support a plurality of bales and after the desired number of bales has been accumulated, will simultaneously drop all of the bales so that in lieu of the bales being individually scattered over a field, they will be dropped in groups.

Another object of this invention is to provide an improved bale dropper attachment for hay balers, the bale dropper attachment being of such a nature whereby it may be readily mounted on existing hay balers and driven by the knotter drive shaft thereof so that the positioning of bales of hay on a bale supporting platform at the rear of the hay baler is automatic.

Still another object of this invention is to provide an improved attachment for hay balers, the attachment including a bale support having means for shifting bales thereon whereby a plurality of bales may be simultaneously positioned on the bale support and there being provided manual means for permitting the tilting of the bale support under the weight of the bales to automatically drop all of the bales carried by the bale support.

A further object of this invention is to provide an improved bale dropper attachment for hay balers, the bale dropper attachment including a bale support having a slide bar mounted thereon for positioning hay bales on the bale support, there being provided suitable linkage connecting the slide bar to the knotter attachment of the hay baler so that the hay bales are automatically positioned on the bale support or bale platform in response to the knotting of a next bale.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view similar to Figure 1 and shows the bale supporting platform in a rearwardly sloping position in the process of dropping bales therefrom, the bale being shown in dotted lines;

Figure 4 is a bottom plan view of the hay baler and bale dropper attachment and shows the means for actuating the slide bar to shift the bales on the bale supporting platform;

Figure 6 is an enlarged fragmentary sectional view taken substantially upon the plane indicated by the section line 6—6 of Figure 2 and shows the latch means for retaining the bale supporting platform in a normal horizontal bale supporting position;

Figure 7 is an enlarged fragmentary sectional view taken substantially upon the plane indicated by the section line 7—7 of Figure 6 and shows further details of the latch;

Figure 8 is an enlarged fragmentary sectional view taken substantially upon the plane indicated by the section line 8—8 of Figure 2 and shows further details of the slide bar;

Figure 2:
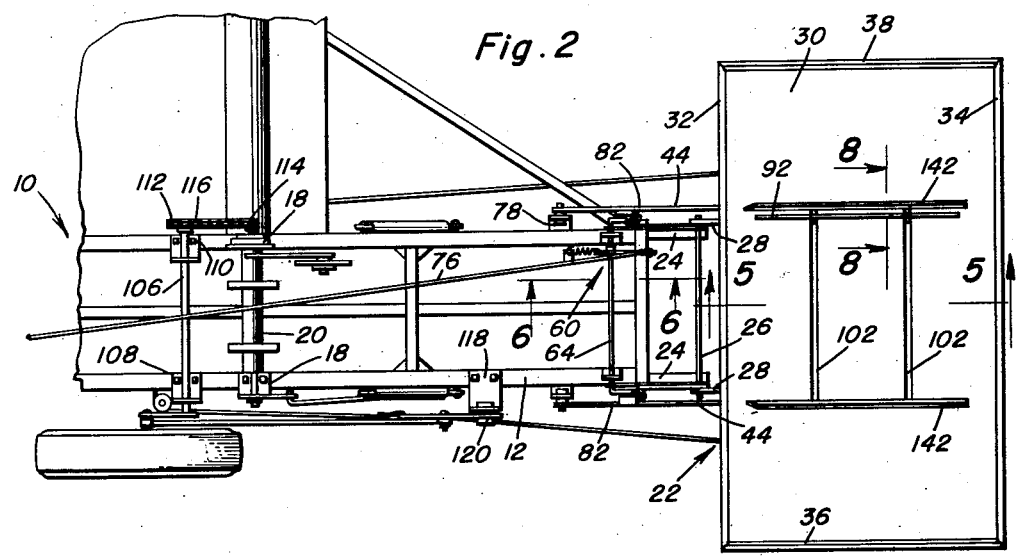
Figure 2 is a fragmentary plan view of the rear portion of the hay baler in Figure 1 and shows further detils of the bale dropper attachment.

Figure 9 is a plan view similar to Figure 2 and shows mounted on the hay baler a modified form of bale dropper, an intermediate portion of the bale supporting platform thereof being broken away; and Figure 10 is a fragmentary elevational view taken substantially upon the plane indicated by the section line 10—10 of Figure 9 and shows the details of the drive for the bale dropper attachment of Figure 9.

Referring now to the drawings in detail, it will be seen that there is illustrated a rear portion of a conventional hay baler which is referred to in general by the reference numeral 10. The hay baler 10 includes a body 12 which is supported by a plurality of wheels including a wheel 14. Carried by the body 12 is a knotter attachment, which is referred to in general by the reference numeral 16. Extending upwardly from opposite sides of the body 12 are supports 18 which carry a knotter drive shaft 20. Inasmuch as the knotter 16 is of a conventional type and only the knotter drive shaft 20 plays a part in this invention, further details of the knotter 16 and the hay baler 10 will not be described hereinafter.

Carried by the rear dispensing end of the body 12 of the hay baler 10 is the bale dropper attachment which is the subject of this inventioin, the attachment being referred to in general by the reference numeral 22. The bale dropper attachment 22 includes a supporting frame in the form of a pair of angle members 24 secured to the rear part of the body 12 on oppoiste sides thereof and extending rearwardly therefrom. Extending transversely between the angle members 24 is a shaft 26 which has pivotally connected thereto mounting ears 28 of a bale supporting platform 30. The bale supporting platform 30 is reenforced along its forward and rear edges by depending angle members 32 and 34. The side edges of the bale supporting platform 30 are reenforced by angle members 36 and 38 which are disposed with the edges thereof in face to face engagement with the surface of the bale supporting platform 30.

Figure 1:
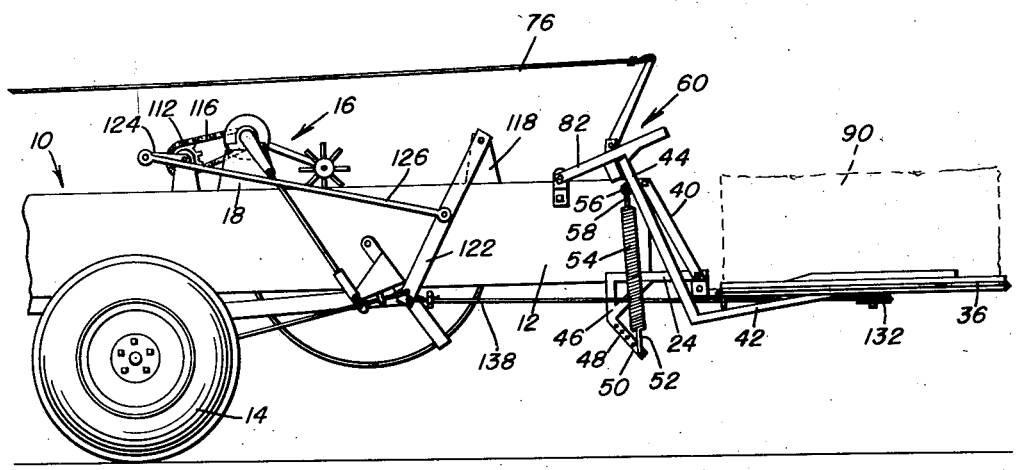
Figure 1 is a fragmentary side elevational view of the rear portion of the conventional hay baler and shows mounted thereon the attachment which is the subject of this invention, the bale supporting platform being provided with a bale which is shown in dotted lines.

Referring now to Figure 1 in particular, it will be seen that the angle members 24 are braced by diagonal braces 40 which extend downwardly from the upper part of the body 12. Further, it will be seen that there is secured to the underside of the bale supporting platform 30 a downwardly and forwardly extending arm 42 which has an upwardly and forwardly extension 44. The arm 42 and its extension 44 is duplicated on the opposite side of the body 12.

Extending downwardly from the forward part of each angle member 24 is a bracket 46 to which there is connected a rearwardly sloping depending arm 48. The arm 48 is provided with a plurality of apertures 50 in which there is selectively positioned a lower hook 52 of a tension spring 54. The upper part of each extension 44 is provided with an eye 56 receiving an upper hook 58 of a respective spring 54, there being a spring 54 on each side of the body 12. It is to be understood that the springs 54 are so tensioned whereby they will return the bale supporting platform 30 to its normal horizontal position once hay bales have been dumped therefrom.

In order that the bale supporting platform 30 may be retained in its normal horizontal bale supporting position after one or more bales have been placed thereupon, there is provided a latch assembly which is referred to in general by the reference numeral 60. As is best illustrated in Figures 6 and 7, the latch assembly 60 includes a pair of upstanding supports 62, there being one support 62 at each side of the body 12. Extending between the supports 62 and journaled therein is a shaft 64 which terminates at its opposite ends in crank portions 66. In order that the shaft 64 may be selectively rotated, there is connected thereto a control lever 68 having a depending portion 70. The control lever 68 is urged in a clockwise direction, as viewed in Figure 6, by a spring 72 connected to the lower portion 70 and to a bracket 74 carried by the body 12 at the opposite end. Connected to the upper end of the control lever 68 is a trip rope 76 which extends forwardly from the control lever 68 to a position adjacent the operator of the hay baler 10 for manual manipulation.

The latch assembly 60 also includes a bracket 78 mounted on the body 12 at opposite sides thereof. Pivotally connected to each bracket 78 by means of a pin 80 is a latch member 82. Each latch member 82 extends upwardly and rearwardly from its pivot pin 80 and is provided with a latching ear 84 engageable with a keeper portion 86 formed on the upper end of the extension 44 of each of the arms 42. Extending inwardly from each of the latch members 82 is a horizontal plate portion 88 which overlies an adjacent one of the crank portions 66. Thus, when the shaft 64 is rotated in a counterclockwise direction by pulling the trip rope 76, the crank portion 66 will lift the latch members 82 out of engagement with the extensions 44 thereby permitting the bale supporting platform 30 to pivot to the position shown in Figure 3 under the load of hay bales, such as the bales 90 disposed thereon. Once the bales 90 have been dropped, the springs 54 will automatically return the bale supporting platform 30 to its normal horizontal position and the latch members 82 will again support the bale supporting platform 30 in its desired position by engagement with the extensions 44.

Referring once again to Figure 2 in particular, it will be seen that the bale supporting platform 30 is of a size to receive three bales 90 in transverse alignment. The bale supporting platform 30 is so positioned with respect to the body 12 of the hay baler 10 that bales 90 coming from the body 12 will be positioned in the center of the bale supporting platform 30. In order that the bales 30 may be sequentially shifted from the center of the bale supporting platform 30 to first one side and then the other, there is carried by the bale supporting platform 30 a longitudinally extending slide bar 92, the slide bar 92 being mounted for movement transversely of the bale supporting platform 30.

Figure 5:
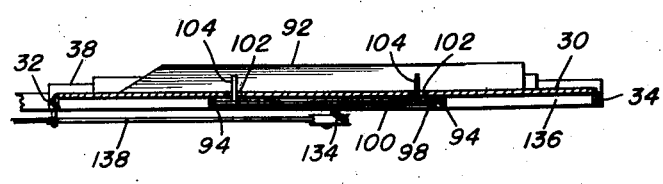
Figure 5 is an enlarged fragmentary longitudinal sectional view taken substantially upon the plane indicated by the section line 5—5 of Figure 2 and shows the specific details of the mounting of the slide bar with respect to the bale supporting platform.

Referring now to Figures 4 and 5 in particular, it will be seen that there is secured to the underside of the central part of the bale supporting platform a pair of longitudinally spaced transversely extending tracks 94. Extending between the tracks 94 and supported thereby is a carriage which is referred to in general by the reference numeral 96. The carriage 96 includes a pair of slide members 98 which are engaged with the tracks 94 and a bar 100 connecting together the slide members 98.

Formed in the bale supporting platform 30 in parallel relation to the tracks 94 is a pair of slots 102. Secured to the bar 100 adjacent opposite ends thereof and extending upwardly through the slots 102 are supporting ears 104 carrying the slide bar 92.

In order that the slide bar 92 may automatically be operated, there is provided suitable drive means which includes a transverse shaft 106 which is carried by mounting brackets 108 and 110 on opposite sides of the body 12. Mounted on the end of the shaft 106 adjacent the mounting bracket 110 is a sprocket 112 which is aligned with a sprocket 114 on one end of the knotter drive shaft 20. The sprocket 114 is one-half the size of the sprocket 112 to provide a two-to-one reduction in the drive between the knotter shaft 20 and the shaft 106. A drive chain 116 is entrained over the sprockets 112 and 114 and connect the two together.

Extending upwardly from the side body 12 to which the bracket 108 is attached is a bracket 118. The bracket 118 has depending therefrom and pivotally connected thereto by means of a pivot pin 120 an arm 122 mounted for oscillatory movement.

The end of the shaft 106 remote from the sprocket 112 is provided with a crank arm 124. Connected to the crank arm 124 is a connecting rod 126 whose opposite end is connected to an intermediate portion of the arm 122. Thus when the shaft 106 is rotated, the arm 122 is oscillated. The arm 122 makes a complete stroke in one direction for each operation of the knotter assembly 16.

Referring now to Figure 4 in particular, it will be seen that there is carried by the underside of the body 12 in the vicinity of the wheel 14, a pair of pulleys 128 and 130. Similar pulleys 132 and 134 are carried by brace members 136 secured to the underside of the bale supporting platform 30. Entrained over the pulleys 128 and 130, 132 and 134 is an endless cable 138 which is connected to the bar 100 by means of a connector 140. An intermediate portion of the cable 138 is also suitably connected to the lower end of the arm 122. Because of the connection between the cable 138, the arm 122 and the slide bar 92, it will be seen that when the knotter assembly 16 is actuated, the slide bar 92 will first move toward one side of the bale supporting platform 30 and then when it is operated the second time the slide bar 92 is moved toward the opposite side of the bale supporting platform 30.

Referring once again to Figure 8 in particular, it will be seen that extending longitudinally of the bale supporting platform 30 are bale retaining members 142. The bale retaining members 142 are also illustrated in Figure 2.

In the operation of the bale dropper attachment 22, a first bale 90 will be deposited in the center of the bale supporting platform 30. Then as the next bale 90 is being tied by the knotter assembly 16, the slide bar 92 will move to the left as viewed from the rear in the position of Figure 2 and shift the bale 90 over against the angle member 36. After the bale which is being tied has been completely tied, it will be moved rearwardly so that it will urge the next bale 90 onto the center part of the bale supporting platform 30. Then as another bale is being tied by the knotter assembly 16, the second deposited bale 90 will be moved to the right end of the bale supporting platform 30, as viewed from the rear. During the continued operation of the hay baler 10, a third bale will be deposited on the center of the bale supporting platform 30. As soon as the third bale has been deposited on the bale supporting platform 30, the trip rope 76 should be pulled so as to permit the bale supporting platform 30 to tilt rearwardly, as viewed in Figure 3, to dump the bales 90 therefrom. After the bales 90 have been dumped from the bale supporting platform 30, the operation may be repeated for the next three bales.

Referring now to Figures 9 and 10, it will be seen that there is illustrated a slightly modified form of bale dropper which is referred to in general by the reference numeral 146. The bale dropper attachment 146 differs from the bale dropper attachment 22 only slightly and only the parts which are different will be described in detail hereinafter.

The bale dropper attachment 146 includes a bale supporting platform 148 which is mounted in the same manner as is the bale supporting platform 30. However, the bale supporting platform 148 is shifted with respect to the body 12 and extends primarily to the left thereof, as viewed from the rear of the hay baler 10. Slots 150 are formed in the bale supporting platform 148. The slots 150 correspond to the slots 102, but are disposed adjacent the right hand side of the bale supporting platform 148. Carried by the bale supporting platform 148 is the slide bar 92. The slide bar 92 is actuated by the endless cable 138 although the pulley 134 is mounted to the right of the bale supporting platform 148. The drive for the cable 138 has been varied inasmuch as the drive sprocket 114 normally carried by the knotter drive shaft 20 has been replaced by a drive sprocket 152 which is the same size as the sprocket 112. Entrained over the sprockets 112 and 152 is the drive chain 116. Inasmuch as the sprockets 112 and 152 are the same size, it will be seen that there will be complete travel of the slide bar 92 upon each operation of the knotter assembly 16. In other words, the slide bar 92 will move first to the left and then back to the right upon each operation of the knotter assembly 16.

In the operation of the bale dropper attachment 146, the bale will be delivered upon the bale supporting platform 148. Then as the next bale is being tied by the knotter assembly 16, the slide bar 92 will be actuated to move the bale 90 to the left. This process is repeated for the next bale to be deposited upon the bale supporting platform 148. When the third bale is deposited upon the bale supporting platform 148, the trip rope 138 is pulled in the conventional manner and the bale supporting platform 148 is permitted to tilt in the same manner described with respect to the bale supporting platform 30 so that the bales 90 may be dumped therefrom.

From the foregoing description of the two bale dropper attachments 22 and 146, it will be readily apparent that they may be conveniently attached to existing hay balers, such as the hay baler 10 with a minimum of adaptation. Further, by a simple operation upon the operating of the hay baler 10 upon the depositing of the third bale upon the bale supporting platforms of the attachment, three bales may be simultaneously dropped on the ground to be picked up later in lieu of the usual one bale. This greatly reduces the time required to remove the bales of hay from a field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bale dropper attachment for hay balers comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale.

2. A bale dropper attachment for hay balers comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale, means carried by said platform mounting said bale supporting platform for rearward tilting about a transverse axis, latch means connected to and normally retaining said bale supporting platform in a bale supporting position.

3. A bale dropper attachment for hay balers comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale, means carried by said platform mounting said bale supporting platform for rearward tilting about a transverse axis, latch means connected to and normally retaining said bale supporting platform in a bale supporting position, counter balance means connected to said bale supporting platform for automatically returning said platform to said bale supporting position after the dumping of bales therefrom.

4. A bale dropper attachment for hay balers comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale, said drive means including an endless cable, an oscillating arm connected to said cable, and means carried by said arm for connecting said arm to a bale knotter.

5. A bale dropper attachment for hay bales comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, bale supporting areas at opposite ends of said track, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale.

6. A bale dropper attachment for hay bales comprising a supporting frame, means for attaching said supporting frame to a hay baler at a delivery end thereof, a bale supporting platform carried by said supporting frame, said platform being of a width for holding at least three bales, a slide bar mounted on said platform for transverse movement, said platform including a track for said slide bar, bale supporting areas at opposite ends of said track, said track being adapted to be aligned with a hay baler delivery end for movement of said slide bar to opposite sides thereof whereby hay bales are shifted to fill said platform, drive means for said slide bar carried by said platform and connected to said slide bar for shifting said slide bar in response to the tying of a bale, said drive means including an endless cable, an oscillating arm connected to said cable, and means carried by said arm for connecting said arm to a bale knotter.

References Cited in the file of this patent

UNITED STATES PATENTS

| | | |
|---|---|---|
| 2,531,560 | De Wall | Nov. 28, 1950 |
| 2,625,002 | Prechel | Jan. 13, 1953 |